(12) United States Patent
Tateoka

(10) Patent No.: US 11,156,199 B2
(45) Date of Patent: Oct. 26, 2021

(54) POWER PLANT USING BUOYANT BODY AND METHOD OF GENERATING POWER BY POWER PLANT USING BUOYANT BODY

(71) Applicant: Tetsuji Tateoka, Kawasaki (JP)

(72) Inventor: Tetsuji Tateoka, Kawasaki (JP)

(*) Notice: Subject to any disclaimer, the term of this patent is extended or adjusted under 35 U.S.C. 154(b) by 0 days.

(21) Appl. No.: 17/054,237

(22) PCT Filed: Jun. 28, 2019

(86) PCT No.: PCT/JP2019/025863
§ 371 (c)(1),
(2) Date: Nov. 10, 2020

(87) PCT Pub. No.: WO2020/009031
PCT Pub. Date: Jan. 9, 2020

(65) Prior Publication Data
US 2021/0071633 A1    Mar. 11, 2021

(30) Foreign Application Priority Data
Jul. 6, 2018 (JP) .............................. JP2018-129084

(51) Int. Cl.
*F03B 13/06* (2006.01)
(52) U.S. Cl.
CPC ........ *F03B 13/06* (2013.01); *F05B 2220/706* (2013.01); *F05B 2260/422* (2020.08)
(58) Field of Classification Search
CPC .... F03B 13/06; F03B 13/08; F05B 2260/422; F05B 2220/706; Y02E 60/16; Y02E 10/20
See application file for complete search history.

(56) References Cited

U.S. PATENT DOCUMENTS

2005/0158184 A1    7/2005  Lin

FOREIGN PATENT DOCUMENTS

| JP | 54-96645 A | 7/1979 |
|----|-----------|--------|
| JP | 62-87185 U | 6/1987 |
| JP | 9-3865 A | 1/1997 |
| JP | 2004-211607 A | 7/2004 |

(Continued)

OTHER PUBLICATIONS

Office Action dated Jul. 5, 2019, issued in counterpart Japanese Appliction No. 2018-129084, with English translation (4 pages).

(Continued)

*Primary Examiner* — Joseph Ortega
(74) *Attorney, Agent, or Firm* — Westerman, Hattori, Daniels & Adrian, LLP

(57) ABSTRACT

Provided are a buoyant body disposed in a water tank, floating in water, and configured to ascend by water being injected and descend by water being drained, a variable capacity tank having a changeable filling capacity of air put inside, a weight placed on an upper part of the variable capacity tank in order to exhaust air in the variable capacity tank, and a generator configured to generate power by rotating a turbine with the air exhausted from the variable capacity tank, in which the upper part of the variable capacity tank is configured to be pulled up by a motion conversion device to take air inside when the buoyant body ascends by the water being injected, and the air exhausted from the variable capacity tank by a weight of the weight is utilized for a rotation of the turbine of the generator to generate power.

10 Claims, 10 Drawing Sheets

(56) References Cited

FOREIGN PATENT DOCUMENTS

| | | |
|---|---|---|
| JP | 2005-127296 A | 5/2005 |
| JP | 2005-201268 A | 7/2005 |
| JP | 2011-43126 A | 3/2011 |
| JP | 2016-98782 A | 5/2016 |
| TW | 200523468 A | 7/2005 |
| WO | 2007/004290 A1 | 1/2007 |
| WO | WO-2007004290 A1 * | 1/2007 .............. F03B 17/04 |

OTHER PUBLICATIONS

International Search Report dated Sep. 17, 2019, issued in counterpart International Application No. PCT/JP2019/025863 (2 pages).
Decision to Grant a Patent dated Sep. 17, 2019, issued in counterpart JP Patent Application No. 2018-129084, w/English translation (4 pages).

* cited by examiner

[FIG. 1]
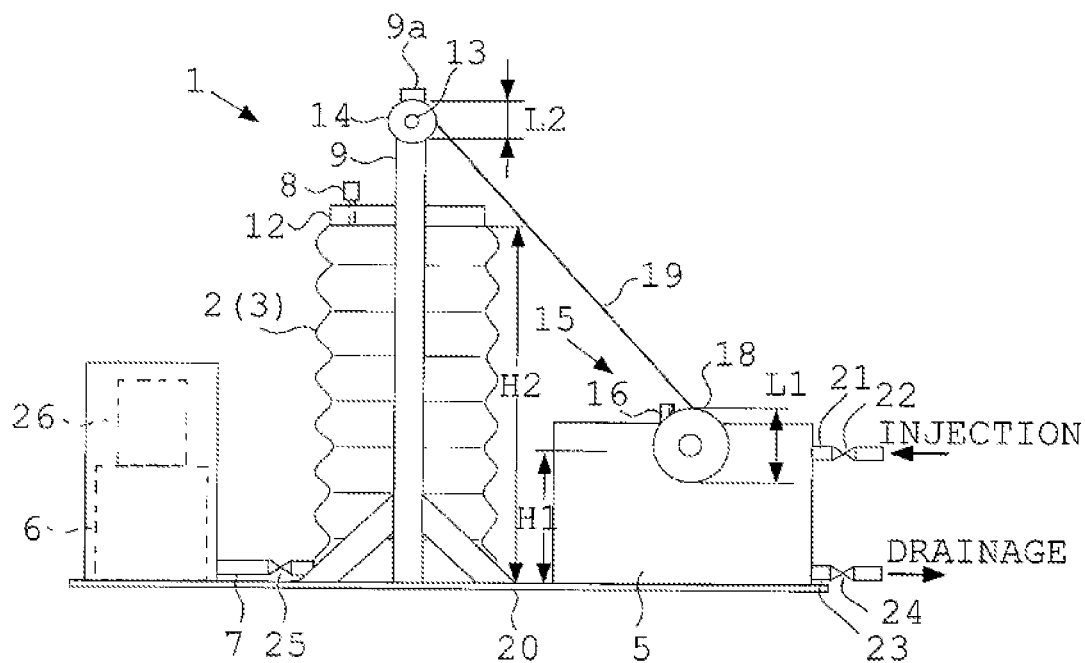
[FIG. 2]
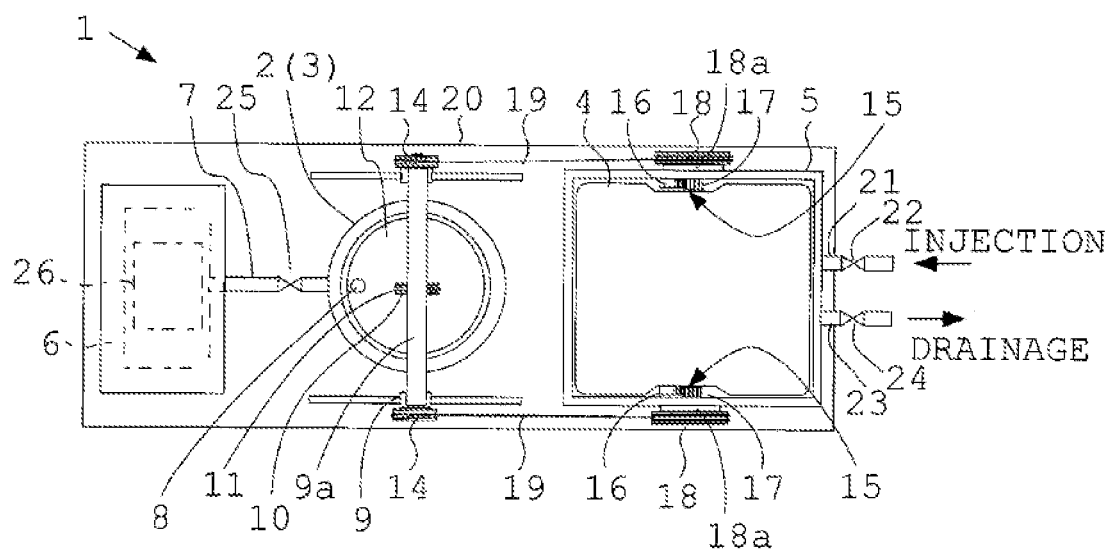

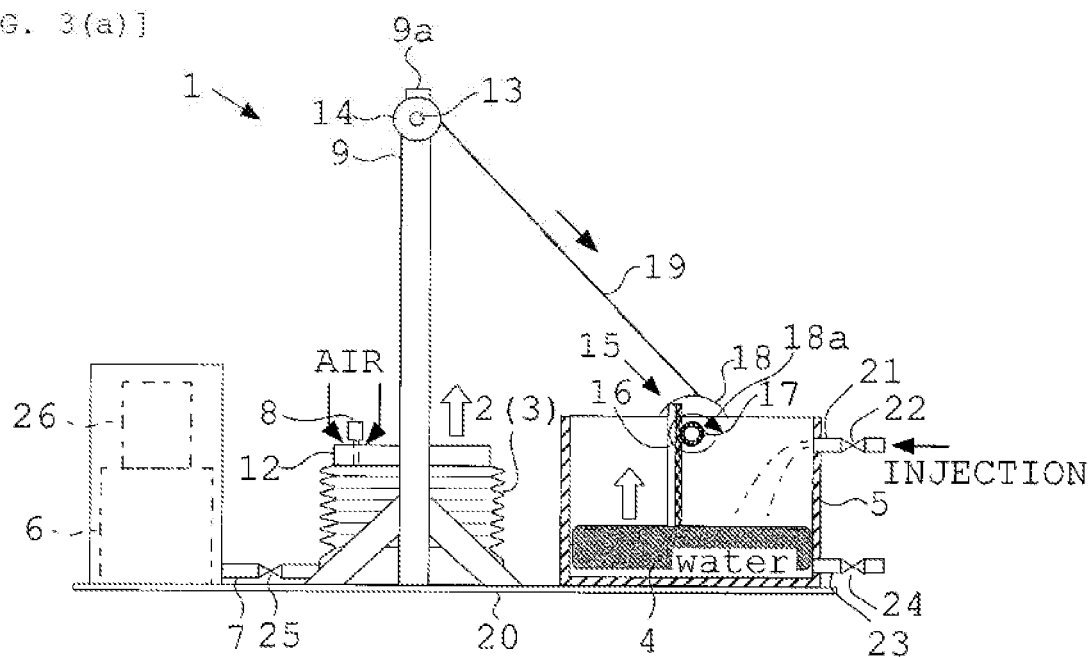
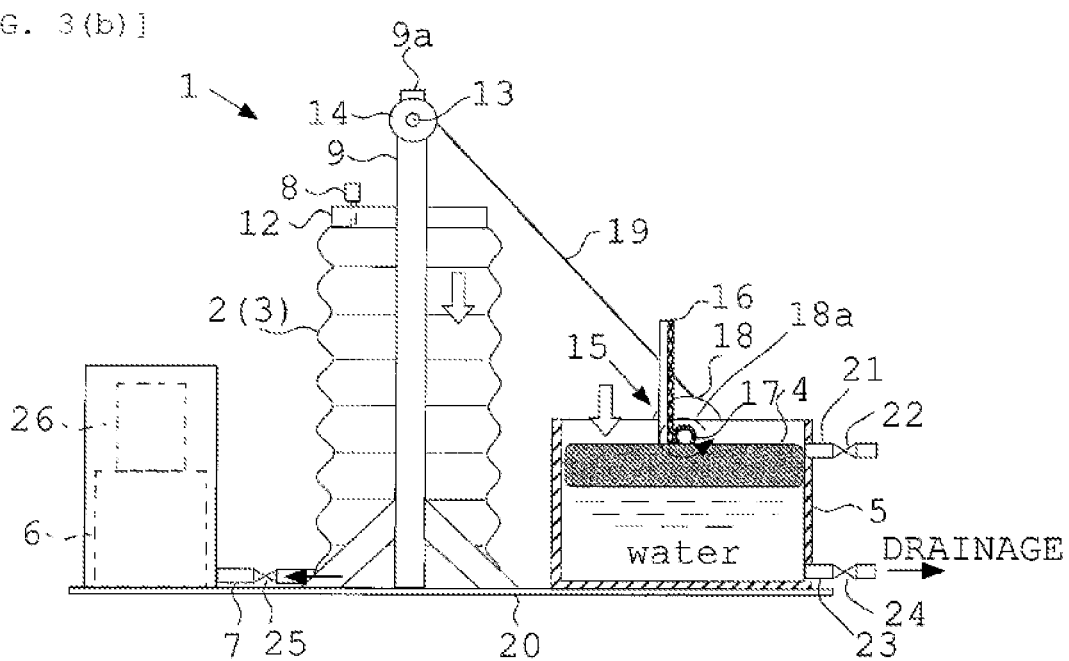

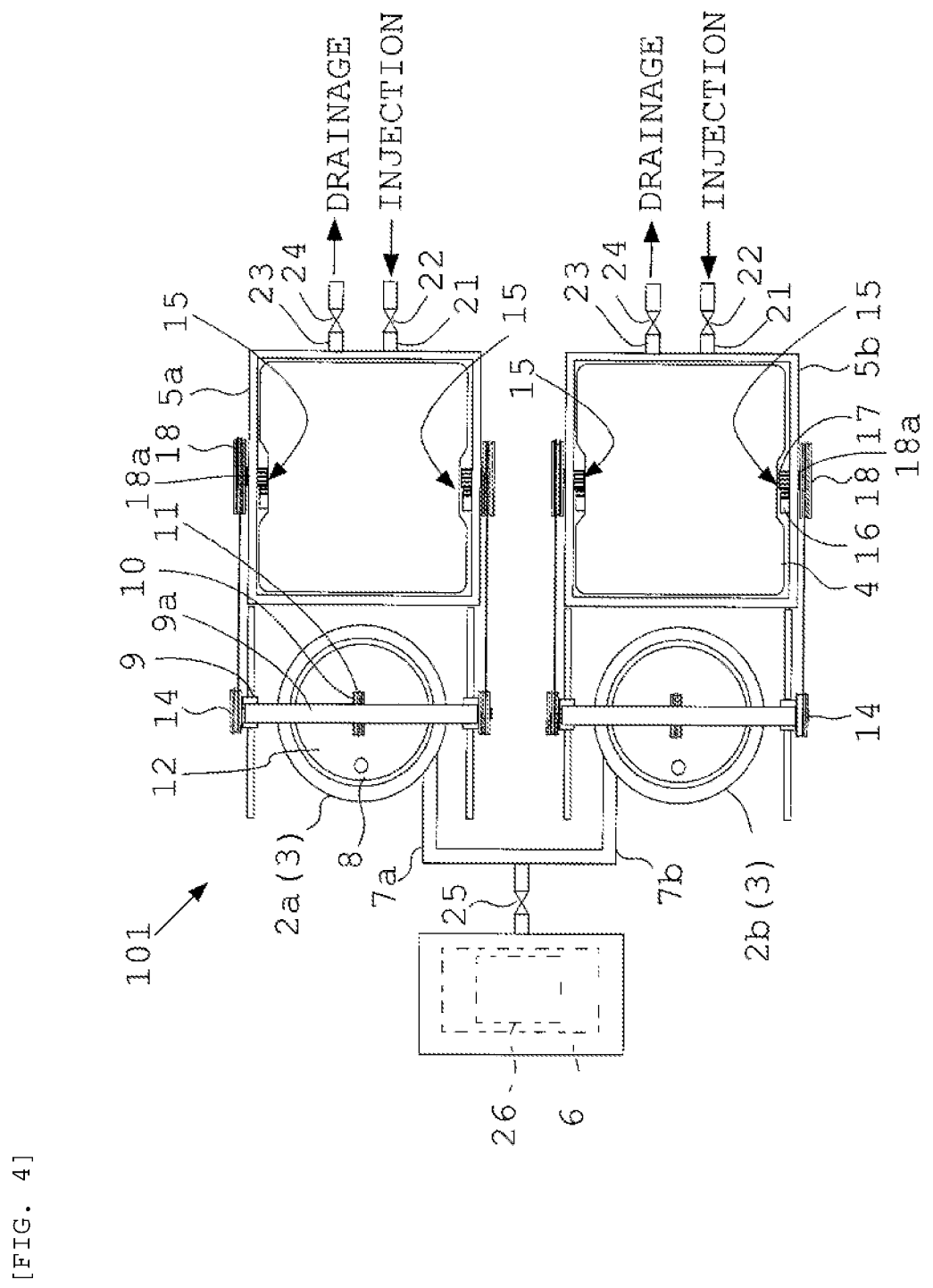
[FIG. 4]

[FIG. 5]
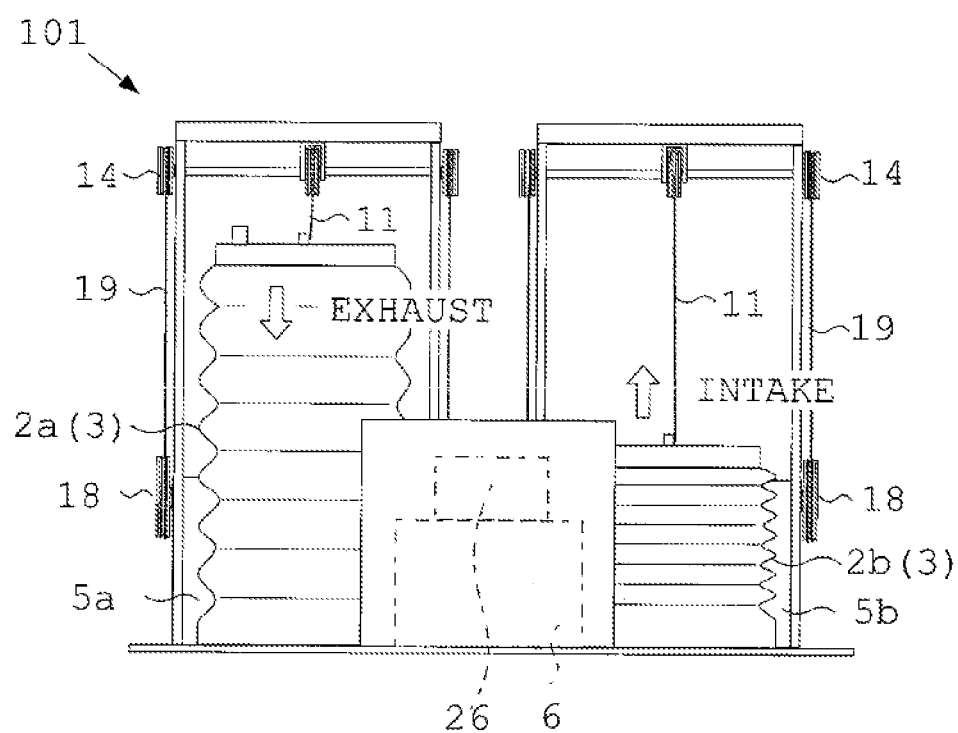

[FIG. 6(a)]
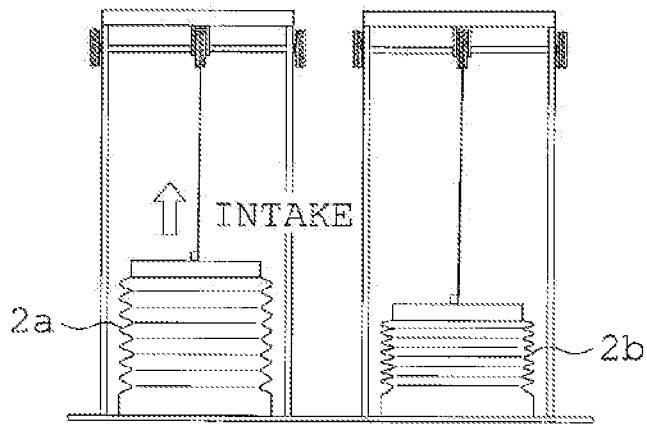
[FIG. 6(b)]
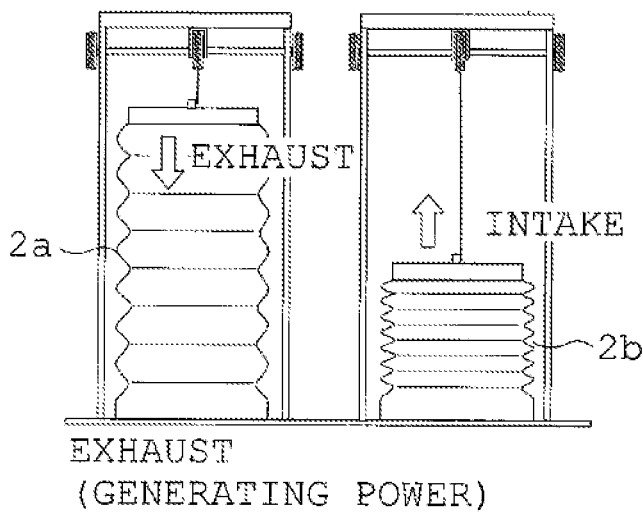
EXHAUST
(GENERATING POWER)
[FIG. 6(c)]
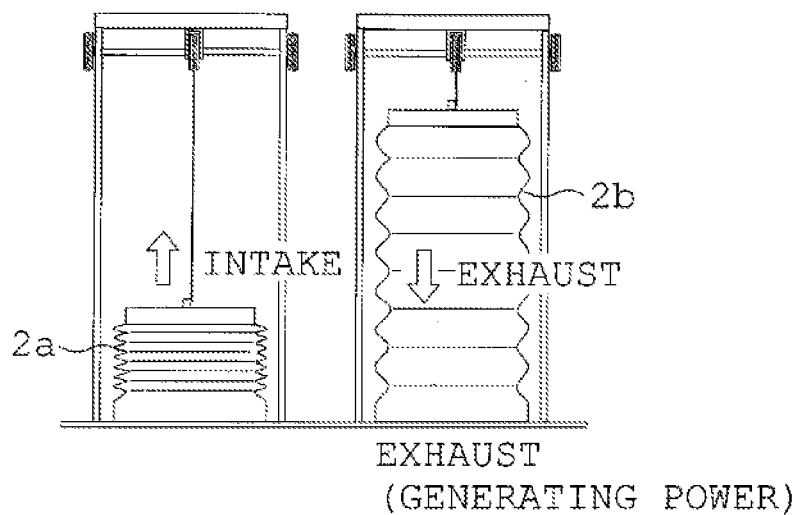
EXHAUST
(GENERATING POWER)

[FIG. 7]
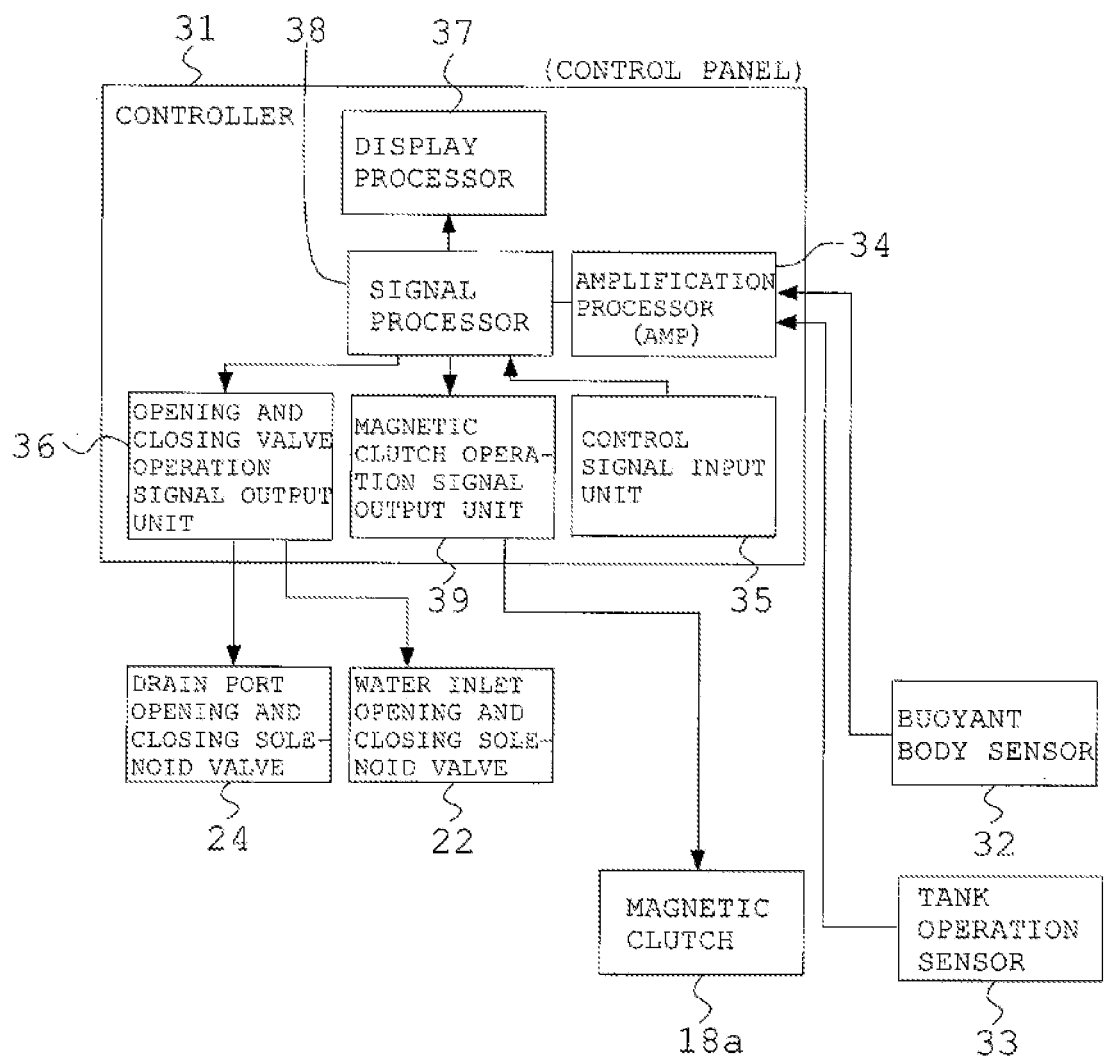

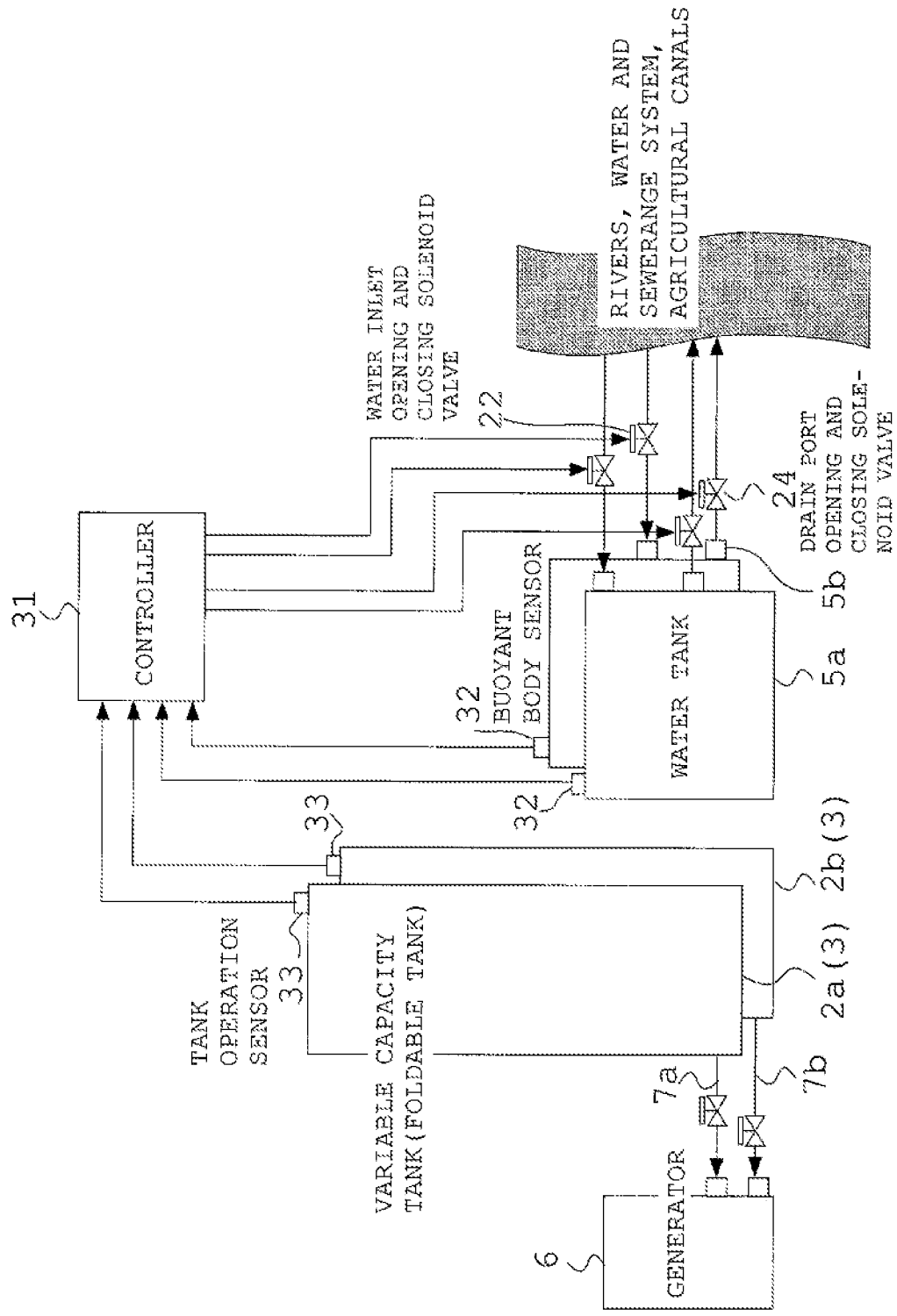
[FIG. 8]

[FIG. 9]
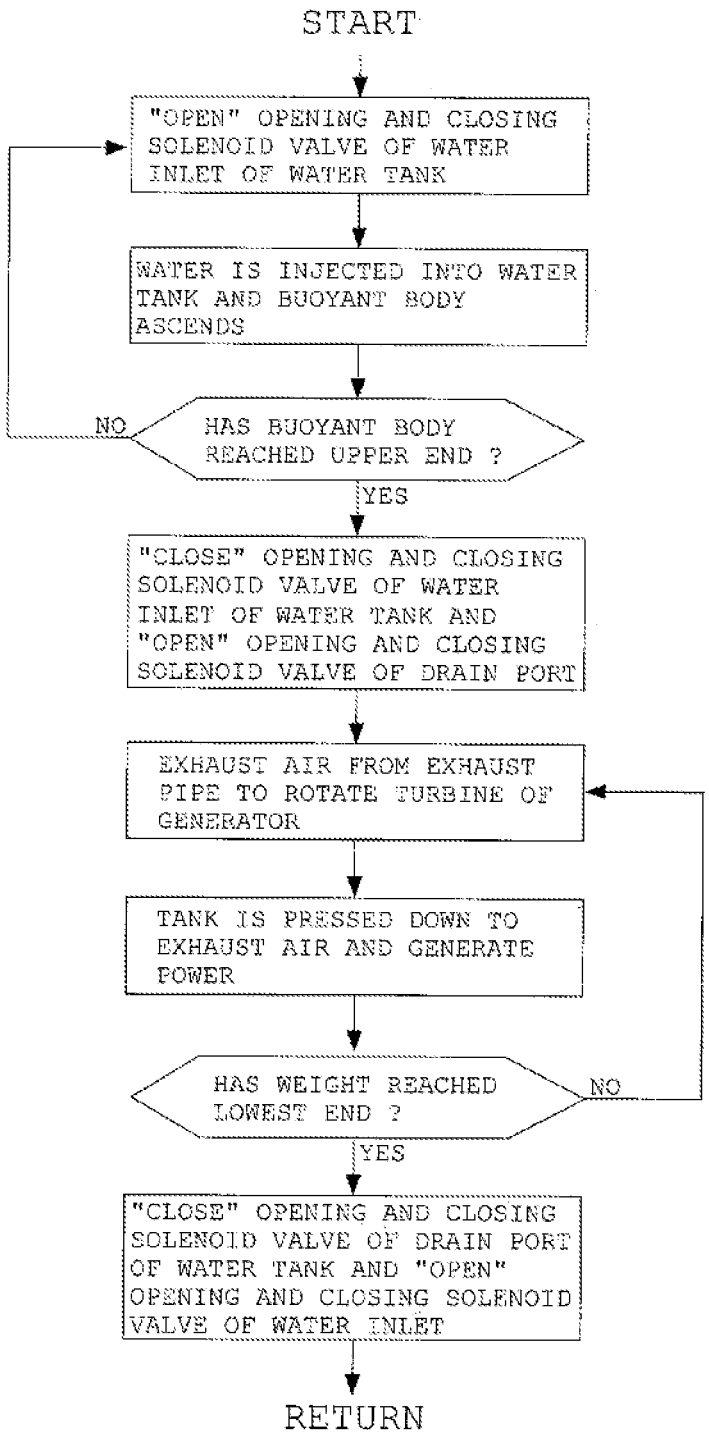

[FIG 10(a)]
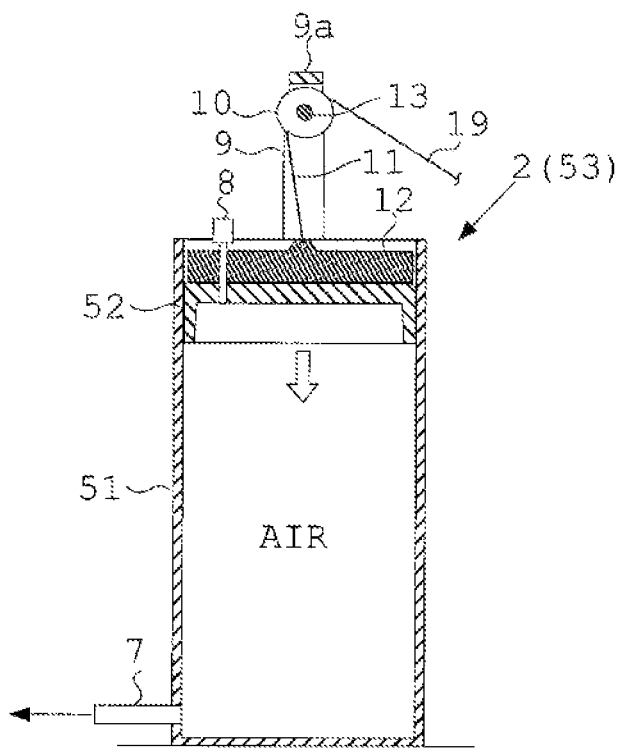
[FIG 10(b)]
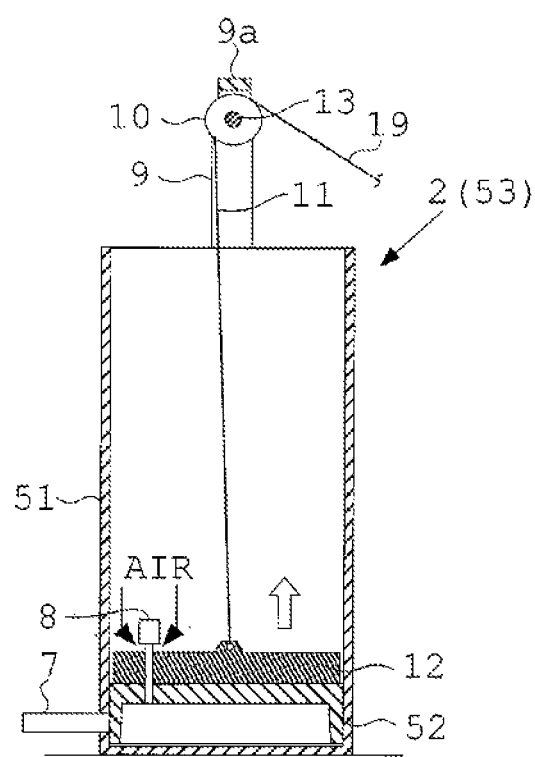

[FIG. 11(a)]
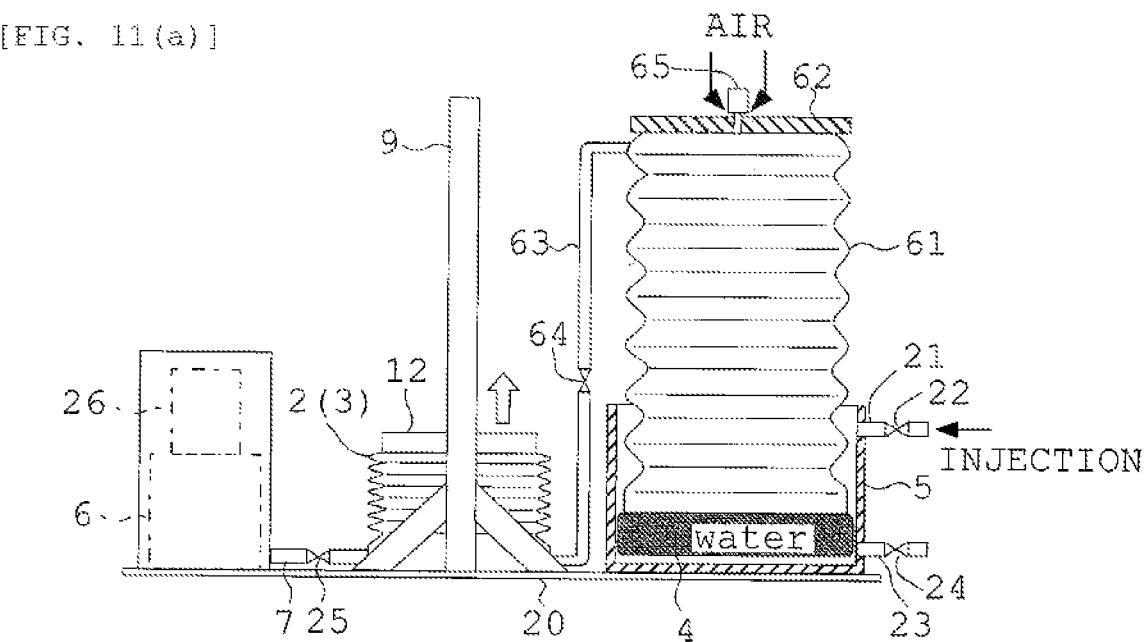
[FIG. 11(b)]
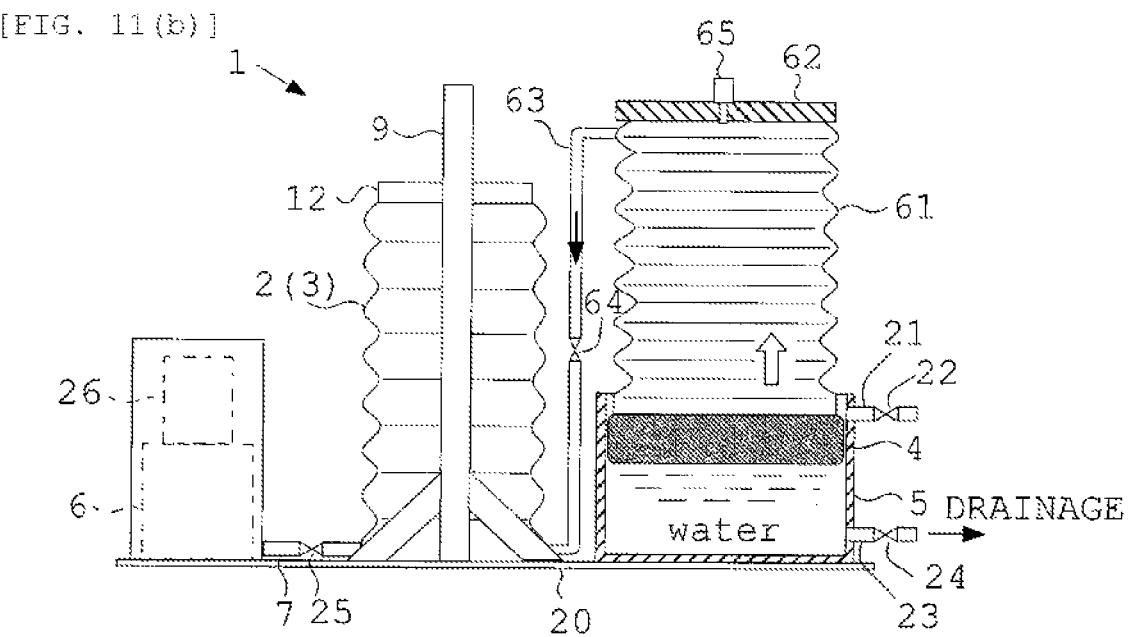

POWER PLANT USING BUOYANT BODY AND METHOD OF GENERATING POWER BY POWER PLANT USING BUOYANT BODY

TECHNICAL FIELD

The present invention relates to a power plant that generates power using a small amount of hydraulic power and a method of generating power by the power plant using the small amount of hydroelectric power, and particularly relates to a power plant using a buoyant body, in which the buoyant body is ascended and descended by repeatedly injecting river water or the like into a water tank and draining the water stored in the water tank, and power is generated by using energy of a vertical movement of the buoyant body and a method of generating power thereof.

BACKGROUND ART

As a method of generating power using water, hydroelectric power generation has been known. Hydroelectric power generation having an amount of generated power of "10,000 kW or less" is called small hydroelectric power generation. A classification of the method of generating power of small hydroelectric power generation includes "flow-type" and "canal-type". This method of generating power is distinguished from large-scale dams of a reservoir type and medium-scale dams of a regulating reservoir type, and uses river water or other water without storing the water.

This small hydroelectric power generation is a method of generating power, effectively utilizing energy currently wasted in general rivers, agricultural water, check dams, water and sewerage systems, and the like. The small hydroelectric power generation has been attracting attention as eco-friendly power generation that does not involve large-scale development such as dams.

The small hydroelectric power generation is capable of stably generating power day and night and throughout the year. The small hydroelectric power generation has a capacity factor as high as 50% to 90%, and can generate 5 to 8 times as much electricity as solar power generation. In addition, the small hydroelectric power generation has little output fluctuation, has no influence on system stability and power quality, and is therefore highly economical. Compared with solar power generation facilities, an installation area of the small hydroelectric power generation is small.

Use of agricultural canals has been also attracting attention. Existing irrigation canals can be used, and facilities that consume the generated power are likely to be located nearby and can be combined with agricultural power. The small hydroelectric power generation in agricultural canals has been attracting attention as local revitalization. A power generation facility using an agricultural canal is a "flow-type" hydroelectric power generation facility that makes effective use of the water in the agricultural canal that flows through a river. Water is taken from the canal and power is generated utilizing a head of a fluvial terrace created by nature.

As a technique relating to small hydroelectric power generation having a structure in which water from agricultural canals, rivers, and the like is stored in a water tank, a water wheel is rotated using a head (positional energy) of a waterway gradient and the like, and a generator connected to the water wheel is rotated to obtain electrical energy, for example, as in "Small Hydroelectric Power Generation System" of JP 2016-98782 A of Patent Literature 1, a small hydroelectric power generation system is proposed. The small hydroelectric power generation system has a water tank in which water flows from outside, a water wheel provided at a position lower than the water tank and rotating with water flowing in from the water tank, a generator connected to the water wheel, a rotation speed controller controlling rotation speed of the generator, and a calculation apparatus calculating optimum rotation speed of the water wheel in accordance with a predetermined formula and transmitting a variable speed control command based on the optimum rotation speed to the rotation speed controller.

CITATION LIST

Patent Literature

Patent Literature 1: JP 2016-93732 A

SUMMARY OF INVENTION

Technical Problem

However, small hydroelectric power generation cannot be used unless there is a considerable elevation difference (head) between a place where water is taken or stored and a place where a water wheel of a generator is installed in order to drop water at high speed and high pressure. The installation location and location conditions have been restricted. There has been a problem that the small hydroelectric power generation cannot be used at a place where there is no elevation difference and a flow rate is slow although there is abundant water near rivers, agricultural water, and dams.

The inventor of the present invention has realized that instead of using water for power generation by rotating a water wheel in a place with abundant water, the abundant water can be efficiently used for power generation by converting the water temporarily into another energy.

The present invention has been devised to solve such a problem. That is, an object of the present invention is to provide a power plant using a buoyant body usable for power generation even in a place without an elevation difference or with weak water force by temporarily converting abundant water into another energy and a method of generating power by the power plant using the buoyant body.

Solution to Problem

A power plant of the present invention is a power plant using a buoyant body configured to generate power using energy of a vertical movement of a buoyant body (4), the power plant including the buoyant body (4) disposed in a water tank (5) and configured to ascend by water being injected and descend by water being drained, a variable capacity tank (2) having a changeable filling capacity of air to be put inside, a weight (12) placed on an upper part of the variable capacity tank (2) in order to exhaust air in the variable capacity tank (2), and a generator (6) configured to generate power by rotating a turbine with the air exhausted from the variable capacity tank (2), in which the upper part of the variable capacity tank (2) is configured to be pulled up using a motion conversion device (15) to take air inside when the buoyant body (4) ascends by the water being injected, and the air exhausted from the variable capacity tank (2) by a weight of the weight (12) is utilized for a rotation of the turbine of the generator (6) to generate power.

The variable capacity tank (2) is a foldable tank (3) configured to expand and contract in a vertical direction and having a bellows-shaped peripheral wall.

Further, the variable capacity tank (2) is a cylinder-piston tank (53) configured to take in air by raising a piston (52) inserted to be vertically movable into a cylinder (51) disposed in the vertical direction and configured to exhaust air by lowering the piston (52).

The motion conversion device (15) has a rack (16) attached to the buoyant body (4) along a direction of the vertical movement and a drive winding wheel (18) attached to a pinion (17) meshing with the rack (16), and the drive winding wheel (18) is configured to wind up a second wire (19) pulling up a member varying a filling capacity of the variable capacity tank (2).

Provided are two apparatuses each including the variable capacity tank (2a, 2b) and the water tank (5a, 5b) having the buoyant body (4) inside configured to pull up an upper part of each variable capacity tank (2a, 2b), in which exhaust pipes (7a, 7b) respectively connected to the variable capacity tanks (2a, 2b) are connected to the generator (6) as one generator, and the turbine of the generator (6) can be configured to be rotated by air exhausted from any of the variable capacity tanks (2a, 2b).

A method of generating power of the present invention is a method of generating power using a buoyant body configured to generate power using energy of a vertical movement of a buoyant body (4), the method including ascending the buoyant body (4) as a water level of a water tank (5, 5a, 5b) rises by injecting water into the water tank (5, 5a, 5b) from a water inlet (21), in which the upper part of the variable capacity tank (2, 2a, 2b) is configured to be pulled up using a motion conversion device (15) to take air inside when the buoyant body (4) ascends, and then, after the variable capacity tank (2, 2a, 2b) is filled with the air, exhausting the air in the variable capacity tank (2, 2a, 2b) by a weight of the weight (12), and rotating the turbine of the generator (6) using the exhausted air to generate power.

The method includes, first, taking air into a first variable capacity tank (2a) included in two apparatuses, the two apparatuses including a first variable capacity tank (2a), a second variable capacity tank (2b), and water tanks (5a, 5b) each having a buoyant body (4) configured to pull up an upper part of each of the first and second variable capacity tanks (2a, 2b), exhausting air from the first variable capacity tank (2a) and rotating a turbine of a generator (6) to generate power, and simultaneously taking air into the second variable capacity tank (2b), and upon completion of exhaustion from the first variable capacity tank (2a), rotating the turbine of the generator (6) by the air exhausted from the second variable capacity tank (2b), and generating power continuously by using the exhausted air of the first and second variable capacity tanks (2a, 2b) alternately.

Advantageous Effects of Invention

In the power plant having the above configuration, the buoyant body (4) placed in the water tank (5) ascends by water being injected, the upper part of the variable capacity tank (2) is pulled up to take air inside, and the air exhausted from the variable capacity tank (2) by the weight of the weight (12) is utilized for the rotation of the turbine of the generator (6) to generate power. A small hydroelectric power plant, which has been limited to be located at a place with a head and a flow rate as in the known art, can easily generate power in any place as long as there is water.

In the method of generating power having the above configuration, the turbine of the generator (6) can be constantly rotated by alternately using two apparatuses each including the variable capacity tank (2a, 2b) and the water tank (5a, 5b) having the buoyant body (4) inside that pulls up the upper part of each variable capacity tank (2a, 2b). Then, stable electric power can be supplied.

Water can be taken from first-class rivers or ordinary rivers to generate power. Water taken from agricultural canals can be used to generate power at any location in water and sewerage systems.

BRIEF DESCRIPTION OF DRAWINGS

FIG. 1 is a front view showing a power plant using a buoyant body of Example 1.

FIG. 2 is a plan view showing the power plant using the buoyant body of Example 1.

FIG. 3(a) and FIG. 3(b) are partially sectional front views showing a method of generating power by the power plant using the buoyant body of Example 1. FIG. 3(a) shows a state in which an upper part of a foldable tank is pulled up to fill with air. FIG. 3(b) shows a state in which the air in the foldable tank is exhausted by a weight to generate power by a generator.

FIG. 4 is a front view showing one example of a power plant using a buoyant body of Example 2.

FIG. 5 is a side view showing one example of the power plant using the buoyant body of Example 2.

FIG. 6(a) to FIG. 6(c) are schematic explanatory views showing switching of exhaustion of two variable capacity tanks of Example 2. FIG. 6(a) shows a state where air is taken into a first variable capacity tank. FIG. 6(b) shows a state where air is exhausted (power is generated) from the first variable capacity tank, and air is taken into a second variable capacity tank. FIG. 6(c) is a state where the exhaustion (power generation) of the first variable capacity tank is completed, and air is exhausted (power is generated) from the second variable capacity tank.

FIG. 7 is a block diagram showing a controller that controls injection into and drainage from a water tank of the power plant of the present invention and air supply to the generator.

FIG. 8 is a schematic configuration diagram showing the controller that controls injection into and drainage from the water tank of the power plant of the present invention and air supply to the generator.

FIG. 9 is a flowchart showing a method of generating power by the power plant of the present invention.

FIG. 10(a) and FIG. 10(b) are front sectional views showing a power plant using a buoyant body of Example 3. FIG. 10(a) shows a state where a piston of a cylinder-piston tank is pulled up to fill with air. FIG. 10(b) shows a state where the air inside the cylinder-piston tank is exhausted with a weight to be used for power generation of the generator.

FIG. 11(a) and FIG. 11(b) are front sectional views showing a power plant using a buoyant body of Example 4. FIG. 11(a) shows a state where the variable capacity tank is supplied with air by an air supply tank. FIG. 11(b) shows a state where the variable capacity tank is filled.

DESCRIPTION OF EMBODIMENTS

The present invention is a power plant including a buoyant body floating on water, disposed in a water tank and configured to ascend by water being injected and descend by water being drained, a variable capacity tank having a changeable filling capacity of air to be put inside, a weight placed on an upper part of the variable capacity tank in order to exhaust air in the variable capacity tank, and a generator configured to generate power by rotating a turbine with the air exhausted from the variable capacity tank. The upper part of the variable capacity tank is configured to be pulled up using a motion conversion device to take air inside when the buoyant body ascends by the water being injected, and the air exhausted from the variable capacity tank by a weight of the weight is utilized for a rotation of the turbine of the generator to generate power.

Example 1

Hereinafter, a preferred embodiment of the power plant using the buoyant body of the present invention will be described with reference to the drawings.

FIG. 1 is a front view showing a principle configuration of a power plant using a buoyant body of Example 1. FIG. 2 is a plan view showing the principle configuration of the power plant using the buoyant body of Example 1.

A power plant 1 using the buoyant body of Example 1 shows the principle configuration of the power plant 1, and uses a foldable tank 3 that expands and contracts in a vertical direction and has a bellows-shaped wall surface as a variable capacity tank 2. The power plant 1 using the buoyant body of Example 1 is a power plant including the foldable tank 3, a water tank 5 in which a buoyant body 4 floating on water is placed inside, and a generator 6 that generates power with jet air.

<Configuration of Variable Capacity Tank (Foldable Tank)>

The foldable tank 3 (variable capacity tank 2) of Example 1 is a tank whose capacity expands when air is filled inside and can store a large amount of air. The foldable tank 3 that expands and contracts in the vertical direction and has the bellows-shaped wall surface can take air inside by pulling up an upper part of the foldable tank 3. A check valve 8 is attached to an upper part of the foldable tank 3 such that the air is exhausted from an exhaust pipe 7 at a lower part of the foldable tank 3 when the foldable tank 3 is pressed from top to bottom. The exhaust pipe 7 is connected to a turbine of the generator 6.

The foldable tank 3 is used by expanding and contracting in the vertical direction. The foldable tank 3 is interposed between support frames 9 to stay upright. In the illustrated example, the support frames 9 have a two-piece configuration, but the number is not limited to the two-piece configuration. The configuration can be a three or four-piece configuration. Further, the configuration of the support frames 9 in the illustrated example is not limited as long as the foldable tank 3 can expand and contract in the vertical direction and can be prevented from tipping over.

A lateral frame 9a is bridged over an upper part of the two-piece support frames 9, and a first winding wheel 10 is hung on the lateral frame 9a. One end of a first wire 11 is hooked to the first winding wheel 10, and the other end of the first wire 11 is hooked to the upper part (weight 12) of the foldable tank 3. By winding up the first wire 11 with the first winding wheel 10, the upper part (weight 12) of the foldable tank 3 is pulled up.

A rotation shaft 13 of the first winding wheel 10 is disposed in a longitudinal direction of the lateral frame 9a, and a second winding wheel 14 is attached to each end of the lateral frame 9a. In the illustrated example, an example is shown in which the second winding wheel 14 is each provided at two locations, but may be provided at one location. Here, the expressions of first and second are used for convenience in order to classify members having the same shape and the same function, rather than to indicate a grade or an order.

The weight 12 placed on the upper part of the foldable tank 3 includes metal, cement, or the like. The weight 12 is used when the air in the foldable tank 3 is exhausted. However, the weight 12 is to have such a weight as to be lifted by a vertical movement by buoyancy of the buoyant body 4, which will be described later.

<Configuration of Water Tank and Buoyant Body>

Water is injected into the water tank 5 of the power plant 1 using the buoyant body of Example 1 from a general river, agricultural water, a check dam, a water and sewerage system, and the like. This is to effectively utilize energy currently wasted in general rivers, agricultural water, check dams, water and sewerage systems, and the like. As the buoyant body 4 to be put in the water tank 5, a buoyant body filled with air or a porous plastic body can be used.

In the illustrated example, as shown in FIG. 2, the buoyant body 4 having a substantially rectangular parallelepiped shape is placed without leaving a gap in the water tank 5 having a rectangular parallelepiped shape so as to be able to move vertically. This is to prevent the buoyant body 4 from tilting, the buoyant body 4 ascending by water being injected into the water tank 5 and descending by water being drained. This is to move the buoyant body 4 vertically smoothly in the water tank 5.

A motion conversion device 15 is a mechanism that temporarily converts a vertical movement of the buoyant body 4 in the water tank 5 into kinetic energy. In the motion conversion device 15 of the illustrated example, a rack 16 is attached to the buoyant body 4 along a direction of the vertical movement of the buoyant body 4, a drive winding wheel 18 is attached to a pinion 17 that meshes with the rack 16, and a second wire 19 pulling up the foldable tank 3 is wound around the drive winding wheel 18. The motion conversion device 15 is provided at two locations for each buoyant body 4 in order to evenly transmit the energy of the vertical movement of the buoyant body 4. Further, the motion conversion device 15 is not limited to this combination of the rack 16 and the pinion 17, and various configurations using a hydraulic configuration and a gas pressure configuration can be used.

With the motion conversion device 15, the first wire 11 is wound up by the second winding wheel 14 and the first winding wheel 10 by using the buoyant body 4 that ascends by injecting water into the water tank 5 and descends by draining water, and the upper part of the foldable tank 3 is pulled up to fill the foldable tank 3 with air.

As shown in FIG. 1, a diameter (L1) of the drive winding wheel 18 is about three times as large as a diameter (L2) of the second winding wheel 14. This is to match a vertical movement distance (H1) of the buoyant body 4 with a vertical movement distance (H2) of the foldable tank 3. Alternatively, the vertical movement interval (H1) of the buoyant body 4 and the vertical movement interval (H2) of the foldable tank 3 can be matched via a transmission mechanism such as a double speed gear.

As shown in FIG. 2, an electromagnetic clutch 18a is attached to the drive winding wheel 18. When the upper part of the foldable tank 3 is pulled up, the drive winding wheel 18 and the pinion 17 of the motion conversion device 15 are connected by the electromagnetic clutch 18a. When the foldable tank 3 is lowered, that is, when power is generated, the electromagnetic clutch 18a is disconnected such that the foldable tank 3 is smoothly lowered and the exhaust gas causes the turbine of the generator 6 to rotate without hindrance.

The drive winding wheel 18 and the motion conversion device 15 do not have to be connected and disconnected by the electromagnetic clutch 18a, but may be connected and disconnected by a mechanical clutch.

The variable capacity tank 2, the water tank 5, and the generator 6 are installed on a stand 20. Further, the illustrated arrangement of the variable capacity tank 2, the water tank 5, and the generator 6 is one example, and the present invention is not limited to this arrangement. Further, the present invention is not limited to one water tank 5 for one variable capacity tank 2. For a small buoyant body 4, a plurality of water tanks 5 can be used to move one variable capacity tank 2 vertically with a plurality of the buoyant bodies 4.

<Description of Power Generation by Foldable Tank>

FIG. 3(a) and FIG. 3(b) are partially sectional front views showing a method of generating power by the power plant using the buoyant body of Example 1. FIG. 3(a) shows a state in which the upper part of the foldable tank is pulled up to fill with air. FIG. 3(b) shows a state in which the air in the foldable tank is exhausted by the weight to generate power by the generator.

In the power plant 1 using the buoyant body of Example 1, as shown in FIG. 3(a), the water taken in from first-class rivers, ordinary rivers, agricultural canals, and water and sewerage systems is put into the water tank 5 by opening an opening and closing solenoid valve 22 of a water inlet 21 of the water tank 5. The buoyant body 4 ascends as a water level in the water tank 5 rises. As the buoyant body 4 ascends, the rack 16 of the buoyant body 4 rotates the pinion 17, and the drive winding wheel 18 connected to the rotation shaft 13 of the pinion 17 rotates. At this time, the electromagnetic clutch 18a of the drive winding wheel 18 is connected.

The second wire 19 wound around the drive winding wheel 18 is attached to the first winding wheel 10 described above. One end of the second wire 19 is hooked to the first winding wheel 10, and the other end of the second wire 19 is hooked to the upper part of the foldable tank 3. The upper part of the foldable tank 3 is pulled up by winding up the first wire 11 with the first winding wheel 10. Air is taken into the foldable tank 3 from the check valve 8.

Next, when the foldable tank 3 is filled with air, the opening and closing solenoid valve 22 of the water inlet 21 of the water tank 5 is "closed", and an opening and closing solenoid valve 24 of a drain port 23 is "open" to drain water. The electromagnetic clutch 18a of the drive winding wheel 18 is disconnected. At the same time that the buoyant body 4 descends, the drive winding wheel 18 also rotates in a reverse direction. Next, a check valve 25 is connected to the exhaust pipe 7 to exhaust air from inside of the foldable tank 3 by the weight of the weight 12. The air is jetted, rotating the turbine of the generator 6 fast to generate power. The generated power charges a battery 26. The power is transmitted from a transmission line through the battery 26. The power is supplied from the battery 26 connected to the generator 6 to operate a computer controller and the opening and closing solenoid valves 22 and 24, which will be described later.

Example 2

<Configuration Example of Power Plant>

FIG. 4 is a front view showing one example of a power plant using a buoyant body of Example 2. FIG. 5 is a side view showing one example of the power plant using the buoyant body of Example 2.

In a power plant 101 of Example 2, it is desirable that two sets of one water tank 5a, 5b (buoyant body 4) and one variable capacity tank 2a, 2b in the above principle configuration are used, and one generator 6 is used to generate power by the two sets. The individual apparatuses and equipment have the same configuration as the above apparatus. Exhaust pipes 7a and 7b connected respectively to the variable capacity tanks 2a and 2b are connected to the one generator 6. This is to generate power stably by using two apparatuses alternatively.

FIG. 6(a) to FIG. 6(c) are schematic explanatory views showing switching of exhaustion of two variable capacity tanks of Example 2. FIG. 6(a) shows a state where air is taken into a first variable capacity tank. FIG. 6(b) shows a state where air is exhausted (power is generated) front the first variable capacity tank, and air is supplied into a second variable capacity tank. FIG. 6(c) is a state where the exhaustion (power generation) of the first variable capacity tank is completed, and air is exhausted (power is generated) from the second variable capacity tank.

As shown in FIG. 6(a), first, the air is taken into the first variable capacity tank 2a. When the first variable capacity tank 2a (3) is filled with air, the first variable capacity tank 2a (3) is exhausted, and the exhaust air is used to rotate the turbine of the generator 6.

As shown in FIG. 6(b), when the first variable capacity tank 2a (3) is exhausted to generate power, the second variable capacity tank 2b (3) is supplied with air simultaneously.

As shown in FIG. 6(c), when the exhaustion of the first variable capacity tank 2a (3) is completed, the exhausted air from the second variable capacity tank. 2b (3) rotates the turbine of the generator 6. Repeated operations of the above keeps rotating the turbine of the generator 6 constantly, thereby generating power stably.

<Configuration Example of System>

FIG. 7 is a block diagram showing a controller that controls injection into and drainage from the water tank of the power plant of the present invention and air supply to the generator. FIG. 3 is a schematic configuration diagram showing the controller that controls injection into and drainage from the water tank of the power plant of the present invention and air supply to the generator. FIG. 9 is a flowchart showing the method of generating power by the power plant of the present invention.

A controller 31 controls injection into and drainage from the water tank 5, 5a, 5b of the power plant 1, 101 of the present invention. As shown in FIGS. 7 and 8, a buoyant body sensor 32, a tank operation sensor 33, an amplification processor 34 (AMP), and a control signal input unit 35 are connected to an input side of the controller 31. The amplification processor 34 (AMP) amplifies detection signals measured by the buoyant body sensor 32 and the tank operation sensor 33.

The buoyant body sensor 32 is a sensor that detects that the buoyant body 4 has ascended to an upper end of the water tank 5, 5a, 5b. The buoyant body 4 being in this position means that the buoyant body 4 does not move even if water is injected into the water tank 5, 5a, 5b. The tank operation sensor 33 is a sensor that detects that the variable capacity tank 2, 2a, 2b is pulled up to the upper end. This means that air cannot be taken into the variable capacity tank 2, 2a, 2b even if the variable capacity tank 2, 2a, 2b is pulled up further.

An opening and closing valve operation signal output unit 36 and a display processor 37 that operate the opening and closing solenoid valves 22 and 24 are connected to an output side of the controller 31. An LED or the like is connected to the display processor 37. The LED or the like informs a current operating status. A signal processor 33 processes the detection signals of the buoyant body sensor 32 and the tank operation sensor 33 on the input side by the amplification processor 34 (AMP) for amplification, and the operations on the output side causes the opening and closing solenoid valve 22 of the water inlet 21 and the opening and closing solenoid valve 24 of the drain port 23 to open and close. The buoyant body 4 placed in the water tank 5, 5a, 5b is ascended by injecting water, and an upper part of the variable capacity tank 2 is pulled up to take air inside. In the variable capacity tank 2, 2a, 2b, the air exhausted from inside of the variable capacity tank 2, 2a, 2b by the weight of the weight 12 can be utilized for the rotation of the turbine of the generator 6 to generate power.

<Modification of Motion Conversion Device>

The motion conversion device 15 is not limited to the above configuration of the pinion 17 and the rack 16. Although not shown, a sprocket and a chain can be used as the motion conversion device. Sprockets are placed at two locations at an upper part and a lower part of the water tank 5, a chain is bridged over the two sprockets, and a protrusion of the buoyant body 4 is fixed to a part on the chain. A drive winding wheel 18 is attached to an upper sprocket, and the second wire 19 pulling up a member that changes a filling capacity of the variable capacity tank (foldable tank 3) is wound around the drive winding wheel 18.

Note that various structures other than the motion conversion device 15 can be used as long as a vertical movement of the buoyant body 4 can be converted into energy by injecting and draining water into and from the water tank 5.

Example 3

<Configuration of Variable Capacity Tank (Cylinder-Piston Tank)>

FIG. 10(a) and FIG. 10(b) are front sectional views showing a power plant using a buoyant body of Example 3. FIG. 10(a) shows a state where a piston of a cylinder-piston tank is pulled up to fill with air. FIG. 10(b) shows a state where the air inside the cylinder-piston tank is exhausted with a weight to be used for power generation of the generator.

The variable capacity tank 2 is not limited to the above foldable tank 3 as long as the turbine of the generator 6 can be rotated by filling the air and exhausting the air all at once. The variable capacity tank 2 used in the power plant using the buoyant body of Example 3 is a cylinder-piston tank 53 configured such that a piston 52 is inserted into a cylinder 51 disposed in the vertical direction so as to be vertically movable, and the piston 52 is raised to take in air and lowered to exhaust air.

The check valve 8 capable of taking air inside the cylinder-piston tank 53 of Example 3 is attached to the piston 52. Similarly, the weight 12 including metal, cement, or the like is placed at an upper part of the piston 52. The weight 12 is used when the air in the cylinder-piston tank 53 is exhausted. The first wire 11 is hooked to the weight 12 as in the foldable tank 3 of Example 1. Although not shown, the check valve 8 for taking in air can be provided in the cylinder 51.

The exhaust pipe 7 exhausting internal air is provided at the lower part of the cylinder 51 of the cylinder-piston tank 53 of Example 3. This exhaust pipe 7 is connected to the turbine of the generator 6.

In the cylinder-piston tank 53 of Example 3, the opening and closing solenoid valve 22 of the water inlet 21 of the water tank 5 is opened to put water into the water tank 5 similarly to the foldable tank 3 of Example 1. As shown in FIG. 3(a), the buoyant body 4 ascends as the water level in the water tank 5 rises. As the buoyant body 4 ascends, the piston 52 can be pulled up by winding up the second wire 19 with the drive winding wheel 18, and air can be taken into the cylinder 51.

Next, in the cylinder-piston tank 53, the piston 52 can generate power by utilizing the air exhausted from inside by the weight of the weight 12 for the rotation of the turbine of the generator 6.

Example 4

<Configuration to Supply Air from Air Supply Tank to Variable Capacity Tank>

FIG. 11(a) and FIG. 11(b) are front sectional views showing a power plant using a buoyant body of Example 4. FIG. 11(a) shows a state where the variable capacity tank is supplied with air by an air supply tank. FIG. 11(b) shows a state where the variable capacity tank is filled.

In Example 4, an air supply tank 61 having a configuration similar to that of the variable capacity tank 2 is used to supply air to the variable capacity tank 2. In Example 4, an upper part of the air supply tank 61 is fixed by a fixing frame 62, and a lower part of the air supply tank 61 is a tank that can freely expand and contract. The buoyant body 4 is attached to the lower part of the air supply tank 61. The buoyant body 4 is disposed in the water tank 5. In Example 4, air is directly fed from the air supply tank 61 to the variable capacity tank 2 by using an air feed pipe 63. A check valve 64 is attached to the air feed pipe 63. The air exhausted from the variable capacity tank 2 is used to rotate the turbine of the generator 6 to generate power.

A check valve 65 is attached to the upper part of the air supply tank 61. When the buoyant body 4 at a lower part of the air supply tank 61 descends, air can be taken inside. When the buoyant body 4 ascends as the water level in the water tank 5 rises, the air inside is supplied to the variable capacity tank 2 through the air feed pipe 63. The air supplied to the variable capacity tank 2 is used to rotate the turbine of the generator 6 as described above.

In this way, the energy of the vertical movement of the buoyant body 4 can be transmitted without using the motion conversion device 15, the first winding wheel 10, the second wire 19, the drive winding wheel 18, and the like.

<Modification 1 of Combination of One Variable Capacity Tank and Multiple Buoyant Bodies (Water Tanks)>

The combination of the variable capacity tank 2 (3) and the buoyant body 4 (water tank 5) is not limited to the combination of one buoyant body 4 (water tank 5) for one variable capacity tank 2 (3) described above as long as the turbine of the generator 6 can be rotated by filling the air and exhausting the air all at once. Although not shown, the power plant of Modification 1 is a combination of one variable capacity tank 2 (3) and a plurality of buoyant bodies 4 (water tanks 5). The number of the buoyant bodies 4 (water tanks 5) is not limited to two, but three buoyant bodies 4 (water tanks 5) can be possible. When the power plant is installed in a place where the water force is weak or the elevation difference is small, one variable capacity tank 2 (3) is preferably moved vertically using the plurality of buoyant bodies 4 (water tanks 5) to rotate the turbine of the generator 6.

<Modification 2 of Combination of Multiple Variable Capacity Tanks and One Buoyant Body (Water Tank)>

On the contrary, although not shown, the power plant using the buoyant body of Modification 2 is a combination of a plurality of the variable capacity tanks 2 (3) and one buoyant body 4 (water tank 5). In a place where the water force is strong and the elevation difference is large, the plurality of variable capacity tanks 2 (3) can be moved vertically using one buoyant body 4 (water tank 5) to rotate the turbine of the generator 6. As shown in Examples 3 and 4, various combinations can be made in accordance with a topography, an amount of water, and water force.

The present invention is not limited to the above embodiment, and various changes can be naturally made without departing from the gist of the present invention as long as water at a place where there is no elevation difference or the water force is weak can be used for the small hydroelectric power generation by converting abundant water temporarily into another energy.

Industrial Applicability

The present invention can utilize a small amount of hydroelectric power such as a place without an elevation difference, general rivers with weak water force, agricultural waterways, check dams, and water and sewerage systems.

REFERENCE SIGNS LIST

1 Power plant using buoyant body
2, 2a, 2b Variable capacity tank
3 Foldable tank
4 Buoyant body
5, 5a, 5b Water tank
6 Generator
10 First winding wheel
11 First wire (Wire)
12 Weight
14 Second winding wheel
15 Motion conversion device
16 Rack
17 Pinion
18 Drive winding wheel
18a Electromagnetic clutch
19 Second wire (Wire)
21 Water inlet
22 Opening and closing solenoid valve of water inlet
23 Drain port
24 Opening and closing solenoid valve of drain port
51 Cylinder
52 Piston
53 Cylinder-piston tank

The invention claimed is:

1. A power plant configured to generate power using a buoyant body with river water, agricultural water, check dam water, or water-supplied water and sewer water, which have small hydropower, the power plant comprising:

a water tank provided with a water inlet having an opening and closing solenoid valve and a drain port having an opening and closing solenoid valve for repeating water storage and water drainage;

a buoyant body disposed in the water tank, the buoyant body being configured to ascend in association with a rise of a water level and descend in association with a fall of the water level;

a variable capacity tank configured to take air inside and exhaust air when the variable capacity tank is pressed downward from above, the variable capacity tank having a changeable filling capacity of air;

a motion conversion device configured to convert the ascending motion of the buoyant body that ascends by injecting river water, agricultural water, check dam water, or water-supplied water and sewer water from the water inlet to the water tank into a motion of pulling up the variable capacity tank;

a weight placed on an upper part of the variable capacity tank, the weight being configured to lower the variable capacity tank to exhaust air taken in the inside of the variable capacity tank;

a generator configured to generate power by rotating a turbine utilizing the air exhausted from the variable capacity tank; and a controller configured to control opening and closing motions of the opening and closing solenoid valve of the water inlet and the opening and closing solenoid valve of the drain port provided on the water tank, wherein when the buoyant body ascends in the water tank by injecting water, the upper part of the variable capacity tank is pulled up using the motion conversion device to take air into the inside of the variable capacity tank, and the controller is configured to repeat an operation of generating power in which the upper part of the variable capacity tank is lowered by a weight of the weight and the air exhausted from the inside of the variable capacity tank is utilized to rotate the turbine of the generator.

2. The power plant using the buoyant body according to claim 1, wherein the variable capacity tank is a foldable tank configured to expand and contract in a vertical direction and having a bellows-shaped peripheral wall.

3. The power plant using the buoyant body according to claim 2, the power plant comprising:

two apparatuses each including a variable capacity tank and a water tank in which the buoyant body configured to pull up the upper part of the variable capacity tank is disposed, wherein exhaust pipes respectively connected to the variable capacity tanks are connected to the generator as one generator, and the turbine of the generator is rotated alternately utilizing air exhausted from the variable capacity tanks.

4. The power plant using the buoyant body according to claim 1, wherein the variable capacity tank is a cylinder-piston tank having a piston vertically movably inserted into disposed in a cylinder in the vertical direction, the cylinder-piston tank being configured to take in air by raising the piston and exhaust air by lowering the piston.

5. The power plant using the buoyant body according to claim 4, the power plant comprising:

two apparatuses each including a variable capacity tank and a water tank in which the buoyant body configured to pull up the upper part of the variable capacity tank is disposed, wherein exhaust pipes respectively connected to the variable capacity tanks are connected to the generator as one generator, and the turbine of the generator is rotated alternately utilizing air exhausted from the variable capacity tanks.

6. The power plant using a buoyant body according to claim 1, wherein the motion conversion device includes a rack attached on a side wall of the buoyant body along a direction of vertical movement of the buoyant body and a pinion attached to the water tank, the pinion meshing with the rack, and a drive winding wheel attached to the pinion is configured to wind up a second wire pulling up a member varying a filling capacity of the variable capacity tank.

7. The power plant using the buoyant body according to claim 6, the power plant comprising:

two apparatuses each including a variable capacity tank and a water tank in which the buoyant body configured to pull up the upper part of the variable capacity tank is disposed, wherein exhaust pipes respectively connected to the variable capacity tanks are connected to the generator as one generator, and the turbine of the generator is rotated alternately utilizing air exhausted from the variable capacity tanks.

8. The power plant using the buoyant body according to claim 1, the power plant comprising:

two apparatuses each including a variable capacity tank and a water tank in which the buoyant body configured to pull up the upper part of the variable capacity tank is disposed, wherein exhaust pipes respectively connected to the variable capacity tanks are connected to the generator as one generator, and the turbine of the generator is rotated alternately utilizing air exhausted from the variable capacity tanks.

9. A method of generating power configured to generate power using a buoyant body with river water, agricultural water, check dam water, or water-supplied water and sewer water, which have small hydropower, the method comprising:

injecting river water, agricultural water, check dam water, or water-supplied water and sewer water into the water tank with an opening and closing solenoid valve of a water inlet opened and with an opening and closing solenoid valve of a drain port closed to raise the buoyant body as a water level of a water tank rises;

pulling up an upper part of a variable capacity tank using a motion conversion device in the raising motion of the buoyant body to fill an inside of the variable capacity tank with air when the buoyant body is raised, upon filling the inside of the variable capacity tank with the air, lowering the variable capacity tank with gravity of a weight placed in the upper part of the variable capacity tank to exhaust the air taken into the inside of the variable capacity tank for generating power by rotating a turbine of a generator utilizing the air to be exhausted; and draining the water from the water tank after the opening and closing solenoid valve of the water inlet is closed and the opening and closing solenoid valve of the drain port is opened, lowering the buoyant body as the water level of the water tank falls, and again repeating the raising motion of the buoyant body to generate power.

10. The method of generating power using the buoyant body according to claim 9, wherein two apparatuses each including a variable capacity tank and a water tank in which the buoyant body configured to pull up the upper part of the variable capacity tank is disposed, river water, agricultural water, check dam water, or water-supplied water and sewer water is first injected into one water tank, the buoyant body is raised as the water level of the water tank rises, and air is taken into one variable capacity tank, power is generated by rotating the turbine of the generator utilizing the air exhausted from the one variable capacity tank, the air is exhausted from the one variable capacity tank and water is simultaneously injected into another water tank, the buoyant body is raised as the water level of the water tank rises, and air is taken into the other variable capacity tank, and upon completion of exhaustion from the one variable capacity tank, the turbine of the generator is rotated using air to be exhausted from the other variable capacity tank, and power is continuously generated alternately utilizing air exhausted from the two variable capacity tanks.

* * * * *